March 14, 1961 P. FAHLENBERG 2,974,577
PHOTOGRAPHIC CAMERA SETTING MECHANISM
Filed April 16, 1957 2 Sheets-Sheet 1

March 14, 1961  P. FAHLENBERG  2,974,577
PHOTOGRAPHIC CAMERA SETTING MECHANISM
Filed April 16, 1957  2 Sheets-Sheet 2

United States Patent Office 2,974,577
Patented Mar. 14, 1961

2,974,577
PHOTOGRAPHIC CAMERA SETTING MECHANISM

Paul Fahlenberg, Baierbrunn, near Munich, Germany, assignor, by mesne assignments, to Compur-Werk Friedrich Deckel OHG, Munich, Germany, a firm Filed Apr. 16, 1957, Ser. No. 653,155
Claims priority, application Germany Apr. 20, 1956
2 Claims. (Cl. 95—64)

This invention relates to a photographic camera, and more particularly to the mechanism for setting the diaphragm aperture of the camera when taking flash pictures.

An object of the invention is the provision of generally improved and more satisfactory camera setting mechanism for use with flash photography.

Another object is the provision of diaphragm setting mechanism of simple and improved form.

Still another object is the provision, in a photographic camera, of distance measuring mechanism or range finder mechanism, in combination with diaphragm aperture adjusting mechanism, and coupling mechanism for coupling the range finder or distance measuring device to the aperture setting mechanism, when flash pictures are to be taken.

A further object is the provision of such coupling mechanism so designed and constructed that it may be adjusted or varied in accordance with variations in the so-called flash guide number.

A still further object of the invention is the provision, in a photographic camera, of two separate distance measuring or range finding devices, one coupled to the focusing mechanism of the camera lens, and the other coupled to the diaphragm aperture adjusting mechanism.

These and other desirable objects may be attained in the manner disclosed as an illustrative embodiment of the invention in the following description and the accompanying drawings forming a part hereof, in which.

The same reference numerals throughout the several views indicate the same parts.

Figure 1:
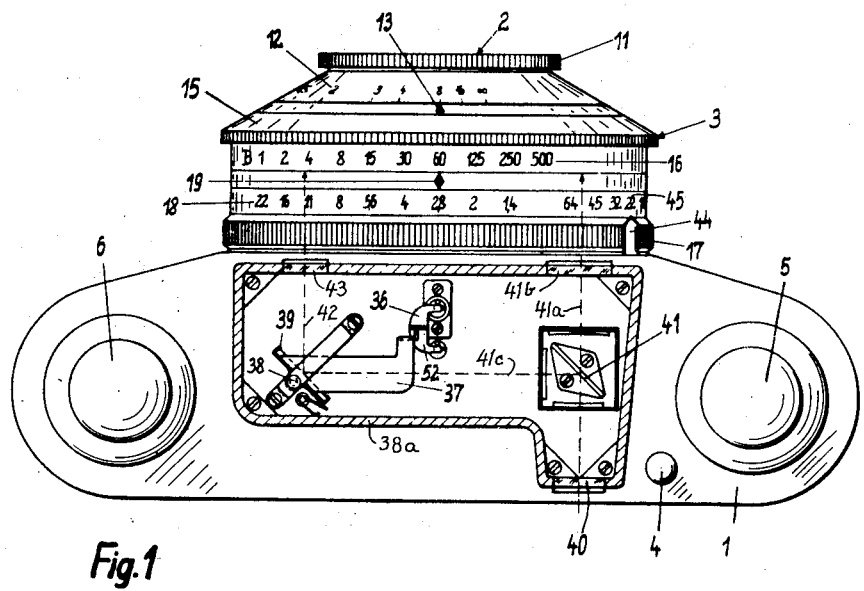
Fig. 1 is a plan view, with parts broken away and parts in horizontal section, of a photographic camera in accordance with a preferred embodiment of the invention.

The camera according to the present invention comprises a main body 1 carrying at its front a lens 2 at least one component of which is movable axially for focusing purposes, the lens being surrounded by the usual casing or housing 3 of a photographic shutter of the objective type having the usual shutter blades pivotally mounted for opening and closing movements to make an exposure, and the usual diaphragm leaves or blades collectively constituting an adjustable iris diaphragm. Neither the shutter blades nor the diaphragm leaves are shown in the drawings, both being well known. They may be of any suitable form, such as those shown, for example, in U.S. Patent No. 1,687,123, issued October 9, 1928, for an invention of Deckel and Geiger. The mechanism for driving the blades may also be of the form disclosed in said patent, or of any other suitable known form.

The camera body is provided at its top with a plunger 4 which, upon depression, serves to trigger or release the shutter for making an exposure. The camera body also has a film winding knob 5 and a film rewinding knob 6, of known form.

The lens 2 may have a plurality of components, and it is immaterial for purposes of the present invention whether only one component or more than one component moves axially for focusing purposes. In the particular construction shown in Fig. 2 of the drawings, it is only the front component which moves axially, focusing movement being effected by rotation of the focusing ring 11 which turns about the optical axis of the lens and shutter as a center of rotation. At the front of the focusing ring 11 is a knurled rim extending circumferentially around the ring, for easy grasping for focusing purposes. A suitable conical part of the ring 11 carries the focusing distance scale 12 which is read in conjunction with a fixed reference mark or pointer 13 on a fixed part of the shutter structure. In the construction illustrated in the drawings, the focusing scale 12 is graduated in distances expressed in meters, but it could equally well be graduated in other suitable units of distance, such as feet or yards.

The shutter also carries the usual shutter speed adjusting ring 15 externally accessible near the front of the shutter, which adjusts the speed with which the shutter blades open and close when making an exposure, all in known manner as shown, for example, in said Deckel and Geiger patent. This shutter speed adjusting ring carries the shutter speed scale or exposure time scale 16, read in conjunction with the fixed reference mark or pointer 19 on a stationary part of the shutter casing. As usual, the various numerals of the scale 16 represent the denominators of fractions whose numerator is 1, indication fractional parts of one second as the time of exposure. For example, when the numeral 60 of the scale 16 is set opposite the pointer 19, the shutter is set for an exposure of 1/60 of a second.

Toward the rear of the shutter casing there is another externally accessible rotatable ring 17 which, like the rings 15 and 11, rotates about the optical axis of the shutter and lens as a center of rotation. This ring 17 carries the diaphragm aperture scale 18, the numerals of which are read in conjunction with the same stationary reference mark 19, these numerals representing the diaphragm aperture expressed as an f number. The external diaphragm setting ring 17 is coupled in fixed relation to the internal diaphragm setting ring 31 which directly controls the position of the iris diaphragm leaves in the usual manner, as shown for example in said Deckel and Geiger patent.

The camera and the shutter structure, as described up to this point, may be of conventional construction, the precise details of which may vary to a considerable extent without affecting the present invention.

When pictures are taken by flashlight, it is customary to adjust the camera in accordance with a so-called flash guide number, often called simply a guide number for brevity, which expresses the product relationship of the diaphragm aperture in terms of f number, multiplied by the distance from the flash illumination source to the object being photographed, expressed in suitable units of measurement such as meters or feet. (Of course the guide number, for given conditions, would be different when used with an object distance expressed in meters, than when used with an object distance expressed in feet, the guide number in the latter case being approximately three times as large as in the former.) As well understood by those familiar with flash photography, the guide number varies with the character of the flashlight used (as to brilliance and duration of illumination) and with the speed or sensitivity of the film, as well as the type of reflector used behind the flash lamp, and the filter factor, if any. But for any given condition of all of these variables, the guide number remains the same. When the proper guide number has been found (usually from information furnished by the flash lamp manufacturer or the film manufacturer) the distance from the flash illumination device (often called a flash gun) to the object being photographed can be divided into the guide number, and the quotient will be the proper diaphragm aperture setting expressed as an $f$ number. Thus if the distance to the object is increased to double its former value, the diaphragm must be readjusted to an $f$ value half as great as former value, or if the distance to the object be reduced to one half its former value, the diaphragm should be stopped down to an $f$ value twice as great.

It will be noted that the variables above mentioned do not take into account the shutter speed setting, because it is customary, when taking flash pictures, to set the shutter for a slow enough speed (that is, a long enough time of exposure) so that the duration of exposure is really determined by the duration of the flash illumination, rather than by the time that the shutter blades are open. It may also be mentioned that, at least in ordinary amateur photography, it is usually assumed that the flash gun is mounted on the camera itself, so that the distance from the source of illumination to the object being photographed is the same as the focus distance from the camera to the object being photographed.

In view of the known relationship between diaphragm aperture and focus distance, and the known use of flash guide numbers as above mentioned, it has been proposed in the past to couple the diaphragm aperture adjustment mechanically to the focus adjustment of the camera, so that when the camera is focused for a given distance, the diaphragm will be automatically set to the proper aperture for taking a flash photograph at that particular distance for which the focus mechanism is set. This coupling arrangement presents difficulties, however, because of the fact that the relationship between the diaphragm aperture and the focus distance is a hyperbolic relationship, with the result that in certain regions or at certain ranges of distance, very small changes in the distance or focus setting should result in very large movements of the diaphragm adjusting member. It is difficult to achieve these relationships in a direct mechanical coupling.

The present invention overcomes these difficulties by coupling the diaphragm adjustment, not to the focus adjustment as previously proposed, but rather to a distance measuring device or range finder, in such manner that when the distance measuring device or range finder is properly adjusted for the distance from the camera to the object being photographed, the diaphragm aperture adjusting member which controls the range finder will automatically be set to the proper aperture or stop value. This arrangement according to the present invention utilizes a cam for coupling the motion of the diaphragm setting ring to the motion of the range finder, and this cam can easily be made in any desired non-linear shape, so that there is no special problem involved in the hyperbolic relationship between the motion of the diaphragm setting ring and the motion of the adjustable part of the range finder, thus overcoming the previous difficulties.

According to the invention, the diaphragm setting ring 17 is adjustably coupled to a second ring 32 which likewise rotates about the optical axis, lying just behind the rings 17 and 31. This ring 32 has on its rear face a cam surface 33, whose rise is in an axial direction. This cam bears against the front end of a pin 35, which is guided for axial movement (in a direction parallel to the optical axis) in a stationary part 34 of the camera body. The rear end of the pin 35 bears against the lower end of a lever 36, pivoted intermediate its ends on a pivot 36a which extends horizontally in a direction across the camera body, the lever being influenced by a light spring 36b which tends to turn the lever in a counterclockwise direction when viewed as in Fig. 2, thus tending to keep the pin 35 lightly pressed forwardly in contact with the cam 33.

The upper end of the lever 36 rests against a forward projection at the right hand end of a horizontal lever 37 mounted to swing on a vertical pivot 38 within the range finder housing 38a mounted on the top of the camera body. A mirror 39 is fixed to the lever 37 to swing with it on the same pivot 38.

The arrangement of these parts is similar to the customary arrangement of a built-in range finder for a photographic camera. When the user of the camera places his eye to the observation window 40 of the range finder, and looks forwardly, the visual ray is partly deflected by a semi-transparent mirror 41. Not all of the light is deflected by this mirror, however, so that one visual ray continues forwardly at 41a and passes out through the front window 41b, the perimeter of which serves also as a viewfinder defining the picture area or field of view of the camera. The part of the visual ray which is deflected by the mirror 41 passes leftwardly as at 41c to the pivoted mirror 39, whence it is again deflected forwardly at 42, passing outwardly through the left-hand front window 43 of the range finder, to the object being photographed.

When the pivoted mirror 39 is swung to a certain angle, depending upon the distance from the camera to the object being photographed, the partial image of the object formed by the light entering the window 43 and reflected by the mirrors 39 and 41 will coincide with the image of the same part of the object as formed by the light entering directly through the window 41b and passing through the semi-transparent mirror 41. Whenever the mirror 39 is not swung to the correct angle for the distance from the camera to the object being photographed, then there will be a lateral displacement, one way or the other, of the image of the part of the object as reflected by the mirrors 39 and 41, as compared with the image as seen directly through the window 41b. All of this is well understood by those familiar with range finders for photographic cameras. It will now be apparent to skilled persons, in view of the foregoing explanation of the present invention, that since the rotation of the diaphragm adjusting ring 17 serves, through the cam 33, to adjust the mirror 39, and since the proper adjustment of the mirror 39 (determined by observing the image in the range finder) is a function of the distance from the camera to the object, and the proper setting of the diaphragm aperture (when taking flashlight photographs) is also a function of the distance from the camera to the object, the cam 33 can easily be made of such shape as to correlate the adjustment of the range finder or distance measuring device with the adjustment of the diaphragm aperture so that when the range finder is properly adjusted for an object at a given distance, the diaphragm aperture is also adjusted properly for a flashlight photograph at this same distance. The cam 33, according to the present invention, is designed in the manner just indicated, to correlate the diaphragm aperture adjustment with the range finder adjustment.

In order to enable this construction to be used under different conditions requiring different guide numbers, the cam 33 is preferably not placed directly on the diaphragm adjusting ring 17 but is placed, as already indicated, on a separate ring 32 which is adjustably rotatable with respect to the ring 17, depending on the flash guide number. For this purpose, the cam ring 32 has a pointer 44 which overlies the peripheral edge of the ring 17 and is set in accordance with a guide member scale 45 marked on the ring 17. The pointer 44 is preferably resilient and engages frictionally with the teeth or serrations of the periphery of the ring 17, the frictional coupling between the ring 17 and the ring 32 being sufficiently tight so that whenever the diaphragm adjusting ring 17 is turned, the cam ring 32 normally turns with it unless it is forcibly restrained in order to set the ring 32 to a different value of flash guide number. The frictional coupling, instead of being by means of the resilient pointer 44, may be accomplished also by means of a small projection or protuberance 46 (Figs. 2 and 3) formed on the cam ring 32 and engaging in any selected one of the depressions or recesses 47 (Fig. 3) formed on the adjacent face of the ring 17, at intervals corresponding to the intervals between the flash guide numerals of the scale 45, so that when the pointer 44 is opposite any particular value of the scale 45, the detent 46 will be seated in an appropriate one of the recesses 47.

In addition to the adjustable range finder or distance measuring element (mirror 39) controlled by the motion of the diaphragm aperture setting ring, there is preferably also a second range finder or distance measuring element controlled by the focusing ring 11, for use in focusing the camera for the proper distance. Therefore, the focusing ring 11 is provided on part of its rear face, with a cam 50 which engages the forward end of a pin 51 movable axially in a direction parallel to the optical axis. This pin 51 extends through the mechanism space 55 in the shutter casing and through suitable openings in the walls or partitions of the shutter casing or housing and the camera structure, in a position so as not to interfere with the motion of other parts and in a manner similar to that disclosed, for example, in German Patent 931,330, to Deckel, and in the U.S. patent application of Kurt Gebele, Serial No. 452,603 (now Patent 2,926,587, granted March 1, 1960). For instance, the pin 51 is located in a position outside of the outline of the shutter blades in the shutter casing when the blades are in their fully opened condition, and it extends through suitable arcuate slots (concentric with the optical axis) in the rings 31 and 32 and any other rotatable parts in the vicinity of the pin 51.

The rear end of the pin 51 engages the lever 52 similar to the lever 36 of the first range finder mentioned, which lever in turn operates upon a second lever 53 similar to the lever 37 previously mentioned, and serves to move a second movable mirror 54 fixed to the lever 53 and similar to and mounted below the mirror 39 to turn on the same pivot 38. The operation of the focusing range finder is substantially the same as that of the diaphragm adjusting range finder as previously described.

Figure 4:
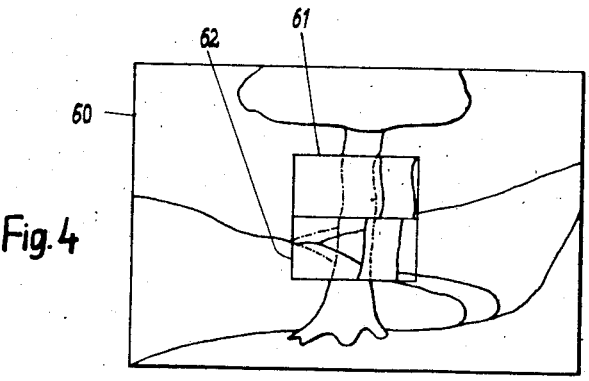
Fig. 4 is a diagrammatic illustration of a typical view seen when looking through the viewfinder of the camera.

A typical view seen when looking through the eyepiece 40 of the range finder, is indicated diagrammatically in Fig. 4, which shows a landscape having a tree as the object being focused upon. The large rectangle or outline 60 indicates the total field of view of the camera, as determined by the edges or perimeter of the window 41b when seen through the eyepiece window 40. The upper small rectangle 61 indicates the field of view reflected through the upper range finder mirror 39 which is controlled by the diaphragm adjustment device, and the lower small rectangle 62 similarly indicates the field of view reflected by the lower mirror 54 controlled by the focusing ring 11.

In the solid line portion of the view within the rectangles 61 and 62, it is seen that the tree trunk is displaced to the right from its proper position as indicated by the broken lines which show the position of the tree trunk when viewed directly through the window 41b.

In using the camera for taking a flashlight photograph, the operator sets the cam ring 32 relative to the diaphragm adjusting ring 17 so that the pointer 44 is opposite the numeral of the scale 45 which indicates the guide number to be used under the circumstances. As already indicated, this guide number takes into account the film speed and the filter factor, if any, as well as the characteristics of the flash apparatus itself, such as the type of flash bulb and the type of reflector used. When the ring 32 has been set for the proper guide number, the ring 17 is turned manually, in one direction or the other, until the reflected image of the tree trunk (or other object being photographed) seen within the rectangle 61 is brought into proper coincidence with the image of the tree trunk as seen directly through the window 41b without the use of the mirror 39. When the parts are thus in coincidence, the operator knows that, for the particular flash guide number for which the apparatus is set, the diaphragm is now set at the proper aperture or stop for taking the flash picture. Also the operator turns the focusing ring 11 in one direction or the other, as required to bring the image of the tree trunk (or other object being photographed) as reflected by the mirror 54 into the rectangle 62, into coincidence with the direct image of the tree trunk as seen through the window 41b. When this has been accomplished, the operator knows that the camera has now been focused properly upon the object to be photographed. It is immaterial whether the adjustment of the focusing ring 11 or the adjustment of the diaphragm ring 17 is accomplished first. In either event, when both of these adjustments have been made (and assuming, of course, that the shutter speed ring 15 is set for a slow enough exposure), the plunger 4 may now be depressed to make the exposure.

In some types of camera focusing mechanism, the entire focusing ring 11 moves axially forwardly or backwardly on screw threads, as it is turned to focus the lens. In other types, the focusing ring turns always in the same transverse plane and has no axial movement, but it is coupled internally to what is sometimes called a worm train which produces the axial movement for carrying the lens or a component thereof forwardly or backwardly. It is immaterial for purposes of the present invention which form of focusing mechanism is used. The two types would, of course, require somewhat different shapes of cam on the focusing ring for controlling the axial movements of the pin 51, but the cam may obviously be made in any desired shape, determined empirically or by calculations.

Figure 2:
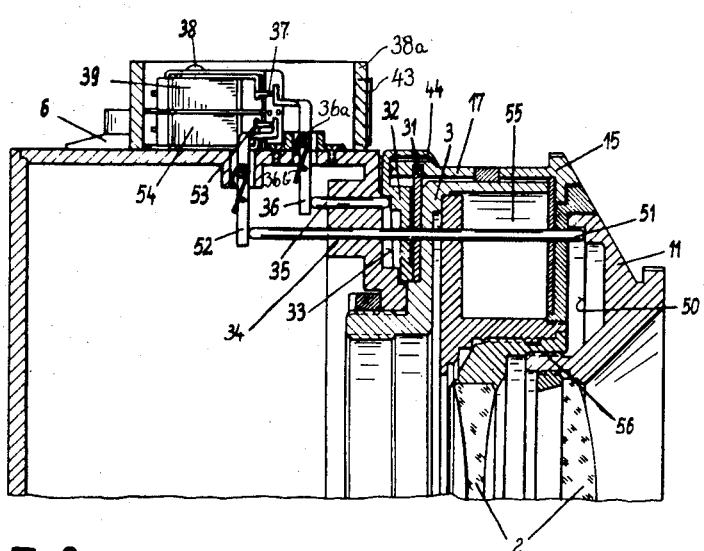
Fig. 2 is a vertical section through the upper part of the camera shown in Fig. 1.

Fig. 2 illustrates a construction in which the focusing ring 11 rides on the screw threads 56 and thus moves axially as it is turned, carrying the front component of the lens axially with it. In such a case, the cam 50 is shaped in such manner that the axial rise of the cam plus the axial bodily displacement of the ring 11 together produce the desired axial movement of the pin 51 for controlling the position of the mirror 54.

Figure 3:
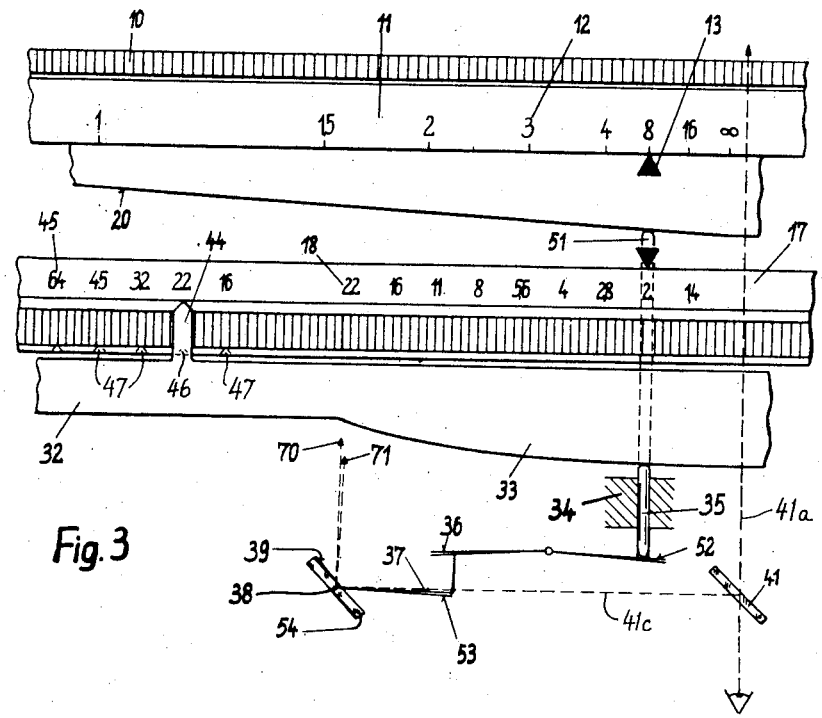
Fig. 3 is a diagrammatic or schematic view showing details of the setting mechanism.

Fig. 3 is intended to illustrate an arrangement in which the lens focusing ring does not move axially, so that the entire axial movement of the pin 51 is produced by the shape of the cam on the focusing ring, rather than by the shape of this cam plus the axial movement of the ring itself. In Fig. 3, the focusing ring 11 is provided with a knurled rim 10 for manual grasping and turning. The focus distance scale is indicated at 12, and is read by means of the fixed reference mark or index pointer 13.

The cam 20 on the focusing ring 11 engages the front end of the pin 51, corresponding to the pin 51 in the previous views. The cam in this instance may be a linear cam, the graduations of the focus distance scale 12 being non-linear. The rear end of the pin 51 operates on the lever 52 which in turn moves the lever 53 connected to the pivoted mirror 54, these last mentioned parts corresponding to the parts 52, 53, and 54 as previously described. The diaphragm aperture ring, as before, is indicated at 17, and has an aperture scale 18 the graduations of which are evenly spaced or linearly arranged, the cam 33 being non-linear. The other parts associated with or controlled by the diaphragm setting ring are indicated by the same reference numerals used in the previous description, and need no further comment.

As an example of the use of the invention, let it be assumed that the object to be photographed (in this case, the tree trunk shown in Fig. 4) is at a distance of 8 meters in front of the camera, and is to be photographed under conditions (as to film speed, type of flash gun, etc.) for which a flash guide number of 22 is appropriate. In accordance with the above mentioned relationship between the guide number, the distance, and the diaphragm aperture, it is seen that for a guide number of 22 at a distance of 8 meters, an aperture of f:2.8 is appropriate.

The cam ring 32 is set in such position relative to the diaphragm adjusting ring 17 that the pointer 44 thereof is opposite the guide number 22 of the scale 45, as shown in both Fig. 1 and Fig. 3. Let it be assumed that the diaphragm is already set at the value f:2, which is the setting position indicated in Fig. 3. This is the wrong position for a proper flash photograph, as indicated by the deviation between the diagrammatic light beam arrows 70 and 71, and the image of the tree trunk as reflected by the mirrors is deflected to the right of its proper position, as seen in Fig. 4. But when the diaphragm adjusting ring 17 is turned one stop to the right, to bring the f value 2.8 opposite the index 51 of Fig. 3 (or the index 19 of Fig. 1), the cam 33 acting on the pin 35, turns the mirror 39 slightly in a clockwise direction on its pivot 38, so that the image of the tree trunk as seen in the rectangle 61 of the view finder is shifted to the left and now coincides with the direct image as seen through the window 41b.

Either before or after making this adjustment of the diaphragm aperture, the operator turns the focus adjusting ring 11 so that the reflected image of the tree trunk in the rectangle 63 of the view finder coincides with the direct view image thereof. When the adjustments of both the focusing mechanism and the diaphragm mechanism are completed, the camera is ready to take the picture.

If the object to be photographed moves, for example, from a distance of 8 meters to a distance of 2 meters from the camera, the diaphragm ring 17 is again turned until the reflected and direct images of the object in the range finder portion 61 are again in coincidence, at which time it will be found that the ring 17 has been moved to an aperture of f:11, assuming that the guide number still remains at 22. Of course the focus adjusting ring 11 must likewise be readjusted for the new focus distance. If the guide number should be changed, on account of a change in the type of flash bulb or a change in the reflector used or for other reasons, then the ring 32 is readjusted with respect to the ring 17, to bring the pointer 44 opposite the new proper guide number of the scale 45. Thereafter, until a fresh adjustment of guide number is needed, the cam ring 32 turns with the diaphragm ring 17.

It has been mentioned earlier that when direct mechanical coupling between the diaphragm ring and the focusing ring is attempted, difficulties are encountered because of the non-linear relationship of the two adjustments to each other, the relationship being hyperbolic rather than linear. However, these difficulties are easily avoided by the present invention, because the cam 33 can be easily made of any non-linear shape required, as well seen in Fig. 3. This is especially important in cameras where the diaphragm adjusting ring is capable of being coupled (for non-flash pictures) to the shutter speed adjusting ring, because in those cases the graduations of the diaphragm aperture scale must be evenly spaced or linear to agree in complementary fashion with those of the shutter speed scale, and therefore the diaphragm aperture scale graduations can not be spaced in a non-linear manner which might make it easier to couple the aperture adjusting ring mechanically to the focus adjusting ring.

The two range finders of the present invention, one coupled to the diaphragm adjusting ring and one to the focusing ring, have been illustrated as having bases of the same size, and having their respective movable mirrors mounted on the same pivot, and having respective fields of view of the same size and located next to each other. However, these features are not essential, and may be varied. Obviously, the principles of the invention are not dependent upon the two pivoted mirrors being placed on the same pivot or even on the same side of the camera, nor is it essential that the fields of view be next to each other or be of the same size. The fields of view of the two range finders can, for example, be of different sizes, one conveniently being inside of and encircled by the other.

Also it will be apparent to those skilled in this art that the invention may be equally well applied to cameras having interchangeable lenses or interchangeable lens and shutter units. When the shutter has an interchangeable lens unit mounted at its front, with the diaphragm adjusting ring on this interchangeable unit at the front of the shutter rather than at the rear as in the present drawings, then the range finder control cam moved by the diaphragm adjusting ring would operate, of course, on a pin extending through the shutter to contact with the cam, similar to the pin 51 of the form here illustrated. It is also immaterial whether the range finders both be of the coincidental type (as here illustrated), or whether one or both of them be of the split field type as distinguished from the coincidental type, the same results being achieved in either case.

Another possibility is to omit entirely the range finder operated by the focusing ring, and to use a focus distance scale marked on the cam ring 32 and read in conjunction with a fixed reference point. Then after the range finder operated by the diaphragm ring has been properly adjusted, the focus distance is read off the scale just mentioned, and the focus ring 11 is set for this same distance by using the scale 12. The second range finder could also be omitted if the lens is of the universal focus type, requiring no focusing.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera adapted for taking flash photographs and having an optical axis, said camera comprising a diaphragm aperture adjusting ring mounted for rotary adjustment about the optical axis, a cam ring also mounted for rotation about the optical axis, means for coupling said cam ring to said aperture adjusting ring in any selected one of a series of relative positions, a flash guide number scale on one of said rings for indicating the relative positions of said two rings with respect to each other, said cam ring having a non-linear cam, a single distance measuring device including a member movable in accordance with variations in distance from the camera to an object being photographed, and a cam follower engaging said cam and operatively connected to said movable member to move said member in accordance with movements of said cam as imparted to it by adjustments of said aperture adjusting ring.

2. Setting mechanism for setting a diaphragm aperture of a photographic camera having an optical axis, for taking a flash photograph in accordance with a chosen flash guide number representing a relationship between the size of the diaphragm aperture and the distance from the camera to the object being photographed, said setting mechanism including a single optical range finder having means for producing two optical images of an object to be photographed and a movable member shiftable to displace one of said images relative to the other, an aperture adjusting ring mounted rotatably about the optical axis to vary the size of the diaphragm aperture, a cam ring rotatable about the optical axis and having a non-linear cam, means for releasably coupling said cam ring for movement bodily with said aperture adjusting ring and for selective shifting to a plurality of different positions with respect to said aperture adjusting ring, a flash guide number scale for indicating the position of said cam ring relative to said aperture adjusting ring, and an operative connection for movng said movable member of said range finder from movement of said cam, said cam being so shaped that when said aperture adjusting ring has been adjusted to move said member of said range finder to bring one of said range finder images into alinement with the other, said aperture adjusting ring will be in the proper position for taking a flash photograph under conditions represented by the selected guide number to which said cam ring is set relative to said adjusting ring.

References Cited in the file of this patent

UNITED STATES PATENTS

| | | |
|---|---|---|
| 1,195,947 | Becker | Aug. 22, 1916 |
| 2,101,543 | Henkel | Dec. 7, 1937 |
| 2,108,751 | Kuppenbender | Feb. 15, 1938 |
| 2,117,428 | Kuppenbender | May 17, 1938 |
| 2,213,749 | Strauss | Sept. 3, 1940 |
| 2,313,567 | Mihalyi | Mar. 9, 1943 |
| 2,334,075 | Davenport | Nov. 9, 1943 |
| 2,351,834 | Phillips | June 20, 1944 |
| 2,395,074 | Schwartz et al. | Feb. 19, 1946 |
| 2,464,559 | Davenport et al. | Mar. 15, 1949 |
| 2,549,230 | Parody | Apr. 17, 1951 |